United States Patent [19]

Ishikawa

[11] Patent Number: 5,724,194
[45] Date of Patent: Mar. 3, 1998

[54] OPTICAL APPARATUS INCLUDING ZOOMING MEANS FOCUS INCLUDING A PART HAVING A BACKLASH, AND CORRECTION MEANS FOR CORRECTING THE BACKLASH OF THE FOCUS APPARATUS

[75] Inventor: Masanori Ishikawa, Tokyo, Japan

[73] Assignee: Canon Kabushiki Kaisha, Tokyo, Japan

[21] Appl. No.: 590,359

[22] Filed: Jan. 25, 1996

[30] Foreign Application Priority Data

Jan. 31, 1995 [JP] Japan .................. 7-034212

[51] Int. Cl.$^6$ .................................................. G02B 15/14
[52] U.S. Cl. .................... 359/696; 359/697; 359/701
[58] Field of Search ........................... 359/694, 696, 359/697, 698, 700, 701, 704

[56] References Cited

U.S. PATENT DOCUMENTS 4,536,072  8/1985  Taniguchi et al. .
4,537,487  8/1985  Taniguchi et al. .
5,144,490  9/1992  Yamanouchi .
5,359,381  10/1994  Miyazawa et al. .................. 354/400

FOREIGN PATENT DOCUMENTS 3144411  6/1991  Japan .

Primary Examiner—David C. Nelms
Assistant Examiner—John P. Cornely
Attorney, Agent, or Firm—Fitzpatrick, Cella, Harper & Scinto

[57] ABSTRACT

A lens barrel or an optical apparatus includes a first lens arranged to move for varying an image forming magnification, a second lens arranged to move for focusing and for compensating for a change in image forming position resulting from a movement of the first lens, a focusing part arranged to drive the second lens and having a backlash, and a zooming part which is arranged to drive the first lens and the second lens in an interlocking manner and to cause the second lens to move by using a part of the focusing part. The backlash is corrected when zooming is performed by the zooming part.

20 Claims, 6 Drawing Sheets

OPTICAL APPARATUS INCLUDING ZOOMING MEANS FOCUS INCLUDING A PART HAVING A BACKLASH, AND CORRECTION MEANS FOR CORRECTING THE BACKLASH OF THE FOCUS APPARATUS

BACKGROUND OF THE INVENTION

1. Field of the Invention

This invention relates to a lens barrel and an optical apparatus having the lens barrel, and more particularly to a so-called inner-focus or rear-focus type (hereinafter referred to as a rear-focus type) zoom lens adapted, for example, for use in a 35-mm-film photographic camera, a video camera or the like, which is arranged to carry out a focusing action with a lens group located nearer to an image plane than a magnification-varying lens group.

2. Description of the Related Art

Photographic cameras using 35 mm films and home video cameras or the like have recently come to be manufactured in smaller sizes and lighter weights. As a result, rear-focus type zoom lenses are now being used for these cameras since they readily give desired variations of magnification and have wide angles of view, short total lens length and smaller front lens diameters and the lens systems are small and light as a whole.

With use of a rear-focus type zoom lens however, the apposite position of a focusing lens group in the direction of an optical axis varies with the magnification varying action of a variator lens group even for one and the same object of shooting. Hence, the position of the focusing lens group must be adjusted in association with the magnification varying action of the variator lens group. For this purpose, lens barrels arranged to include a position adjusting mechanism for the focusing lens group have been variously developed.

For example, a zoom lens disclosed in Japanese Laid-Open Patent Application No. HEI 3-144411 comprises a zooming cam ring which rotates in a fixed position in response to zooming (magnification varying action), a zoom cam which is formed on the zooming cam ring, a first cam follower which engages the zoom cam, a zooming lens group which is arranged to move in association with the motion of the first cam follower, a focusing cam ring which is arranged to vary the initial position of a focusing lens group in the direction of an optical axis during the magnification varying action and to determine an amount by which the focusing lens group is to be drawn out during focusing, a focus cam formed on the focusing cam ring, a second cam follower which engages the focus cam, the focusing lens group which is used also for zooming and is arranged to move in association with the motion of the second cam follower, a focus rotation member which is arranged to cause the second cam follower to rotate in response to a focusing action, and a moving mechanism which is arranged to cause the focusing cam ring to rotate and move in the direction of the optical axis in response to the rotation of the zooming cam ring. The zoom lens is thus arranged to adjust the moving amount of the focusing lens group according to the magnification varying (zooming) action.

In a zoom lens of the kind described above, if a focus driving system has a backlash in moving the focusing lens group according to a magnification varying action, the rotation of the focusing cam ring caused in response to the rotation of the zooming cam ring would cause the focus rotation member to rotate by the amount of backlash, which represents a deviation (error) of the focusing position.

SUMMARY OF THE INVENTION

It is an object of this invention to provide a lens barrel which is arranged to eliminate any deviation or error of the focusing position during zooming, or an optical apparatus such as a camera or the like which is arranged to eliminate any deviation or error of the focusing position.

To attain this object, a lens barrel or an optical apparatus according to this invention comprises a first lens arranged to move for varying an image forming magnification, a second lens arranged to move for focusing and for compensating for a change in image forming position resulting from a movement of the first lens, focusing means, having a backlash, for driving the second lens, zooming means for driving the first lens and the second lens in interlocking relation, and means for correcting the backlash when zooming is performed by the zooming means.

In accordance with a preferred embodiment of this invention, there are further provided information storing means for storing information about a driving direction in the focusing operation, information forming means for forming information indicative of a driving direction for the zooming operation, and determining means for determining, on the basis of information from the information storing means and information from the information forming means, whether the backlash is to be corrected or not. The backlash is corrected only when the determining means determines that the backlash is to be corrected. The determining means determines that the backlash is to be corrected if the driving direction in the focusing operation and the driving direction for the zooming operation coincide with each other, and determines that the backlash is not to be corrected if the driving direction in the focusing operation and the driving direction for the zooming operation are opposite to each other.

Further, in the preferred embodiment, the backlash is corrected by the focusing means before zooming is performed by the zooming means.

The term "backlash" as used in the present specification means a play among members forming the focusing means, such as a cam or a gear.

The above and other objects and features of this invention will become apparent from the following detailed description of preferred embodiments thereof taken in connection with the accompanying drawings.

DETAILED DESCRIPTION OF THE PREFERRED EMBODIMENTS

Figure 1:
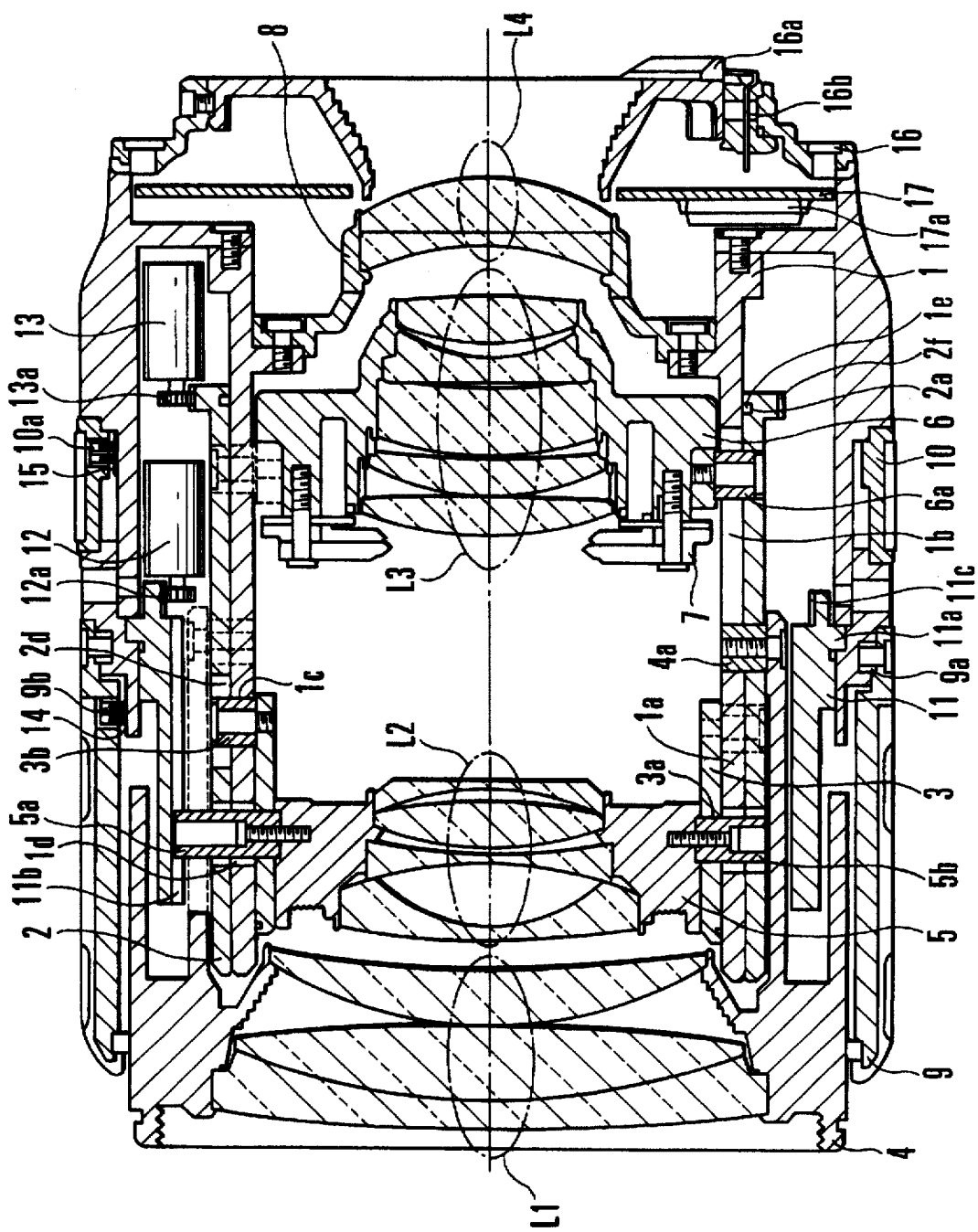
FIG. 1 is a sectional view showing the essential parts of a lens barrel which is arranged according to this invention as a first embodiment thereof.
Figure 2:
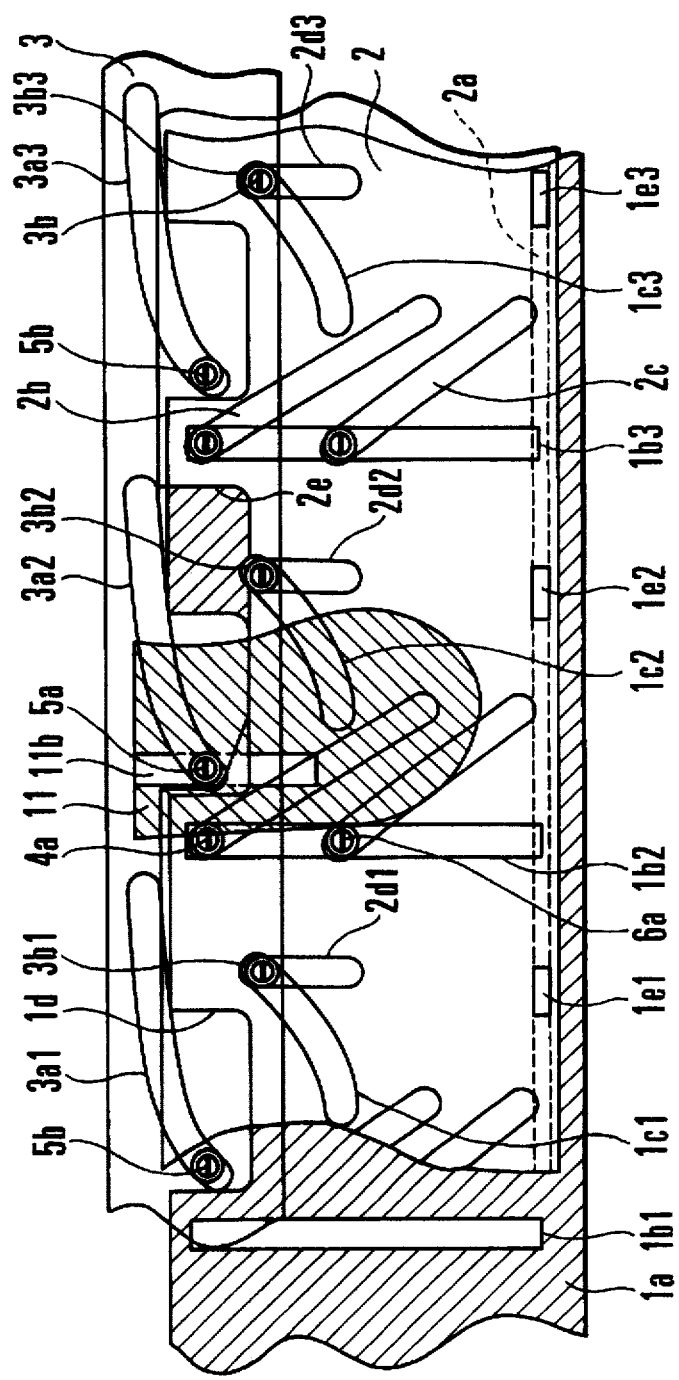
FIG. 2 is a development view showing in outline a portion of the lens barrel shown in FIG. 1.
Figure 3:
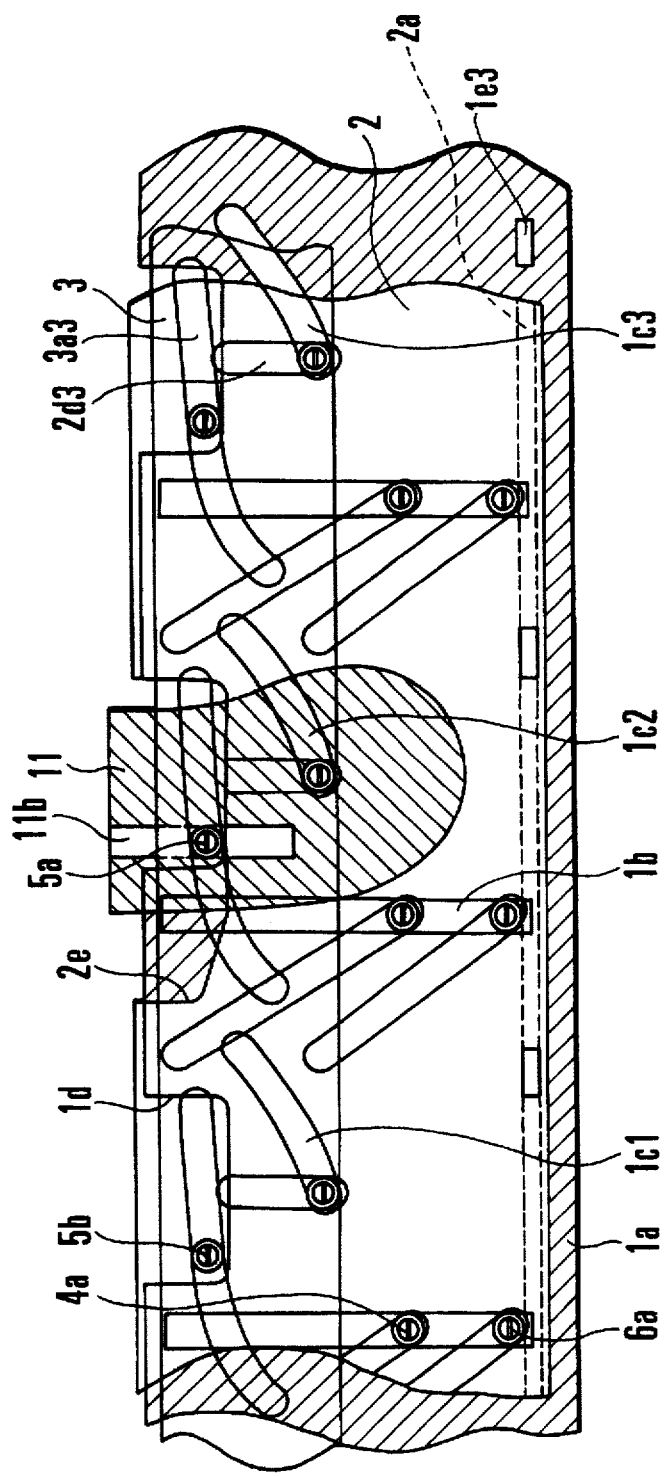
FIG. 3 is a development view showing in outline also a portion of the lens barrel shown in FIG. 1.

FIG. 1 shows in a sectional view the essential parts of a lens barrel which is arranged according to this invention as a first embodiment thereof. FIGS. 2 and 3 are development views respectively showing in part the lens barrel of FIG. 1.

Referring to FIG. 1, the lens barrel includes a first lens group L1, a second lens group L2 for focusing, a third lens group L3, and a fourth lens group L4. In the case of the first embodiment, a magnification varying action, i.e., zooming, is performed by causing the first lens group L1 and the third lens group L3 to move along an optical axis. A change in focusing position caused by the magnification varying action is compensated for (focus adjustment) by causing the second lens group L2 to move along the optical axis.

A tubular fixed member 1 has a guide part 1a. The guide part 1a is provided with three longitudinal slots 1b (1b1, 1b2 and 1b3), three zoom correction cams 1c (1c1, 1c2 and 1c3), three cutout parts 1d (1d1, 1d2 and 1d3) and three protruding parts 1e (1e1, 1e2 and 1e3). A zoom cam ring 2 is rotatably arranged on the periphery of the guide part 1a of the fixed member 1. The zoom cam ring 2 has a circumferential groove 2a, which is formed in the rear inner circumferential part of the zoom cam ring 2 and is fitted on the protruding parts 1e of the fixed member 1 in such a way as to permit the zoom cam ring 2 to rotate around an optical axis in a fixed position.

As shown in FIG. 2, the zoom cam ring 2 has three cam slots 2b for the first lens group L1, three cam slots 2c for the third lens group L3, three rectilinear slots 2d (2d1, 2d2 and 2d3) and a cutout part 2e. The zoom cam ring 2 is provided further with a gear part 2f, which is formed at the rear end part of the zoom cam ring 2 to mesh with an output gear 13a, which will be described later herein.

A focus cam ring 3 is arranged to be rotatable along the inner circumferential side of the guide part 1a. The focus cam ring 3 has three focus cams 3a (3a1, 3a2 and 3a3) and three pins 3b (3b1, 3b2 and 3b3). The pins 3b respectively engage both the zoom correction cams 1c provided in the fixed member 1 and the rectilinear slots 2d provided in the zoom cam ring 2.

A first lens group tube 4 holds the first lens group L1, and the inner circumferential side of the first lens group tube 4 is fitted on the periphery of the zoom cam ring 2. The first lens group tube 4 has three rectilinear rollers 4a which are arranged from a fitting engagement part toward the optical axis. The rollers 4a respectively engage both the longitudinal slots 1b provided in the guide part 1a and the cam slots 2b provided in the zoom cam ring 2 for the first lens group L1.

A second lens group tube 5 holds the second lens group L2. The second lens group tube 5 has its outer circumferential side fitted in the inner circumference of the focus cam ring 3 and has one focus pin 5a and two pins 5b. These pins 5a and 5b are arranged in positions equally dividing the circumference of the second lens group tube 5 to restrict and control the axial position of the second lens group tube 5 by respectively engaging the focus cams 3a2, 3a1 and 3a3 formed in the focus cam ring 3.

A third lens group tube 6 holds the third lens group L3. The outer circumferential side of the third lens group tube 6 is fitted in the inner circumference of the guide part 1a of the fixed member 1. The third lens group tube 6 has three third lens group rollers 6a, which are arranged on the outer circumferential part of the third lens group tube 6. The third lens group rollers 6a respectively engage both the longitudinal slots 1b provided in the guide part 1a and the cam slots 2c provided in the zoom cam ring 2 for the third lens group L3.

An electromagnetic diaphragm unit 7 is held by the third lens group tube 6. A fourth lens group tube 8 holds the fourth lens group L4 and is secured to the fixed member 1 with screws. A zoom operation ring 9 is rotatably held by the fixed member 1 at an abutting part 9a, which is located at one end of the zoom operation ring 9. The zoom operation ring 9 has a zoom brush 9b which is provided for obtaining a zoom signal. A focusing operation ring 10 is rotatably held by the fixed member 1 and is provided with a focus brush 10a for obtaining a focus signal.

A focus rotation member 11 is rotatably held by the fixed member 1 at a protruding part 11a. The focus rotation member 11 has a longitudinal groove 11b which engages the focus pin 5a provided on the outer circumferential side of the second lens group tube 5 in such a way as to restrict the rotation of the focus pin 5a, and a gear part 11c which is in mesh with an output gear 12a, which will be described later. A focus driving unit 12 is composed of a motor and a reduction gear and is also provided with the output gear 12a which is in mesh with the gear part 11c of the focus rotation member 11. A zoom driving unit 13 is composed of a motor and a reduction gear and is provided with the output gear 13a which is in mesh with the gear part 2f of the zoom cam ring 2.

A circuit board (a sensor) 14 which is provided for obtaining the zoom signal is held by the fixed member 1 and is arranged to detect the direction and the amount of zoom driving in accordance with the sliding movement of the zoom brush 9b of the zoom operation ring 9. A circuit board (a sensor) 15 which is provided for obtaining the focus signal is held by the fixed member 1 and is arranged to detect the direction and the amount of focus driving in accordance with the sliding movement of the focus brush 10a of the focus operation ring 10. A mount 16 is integrally mounted on the fixed member 1 and has an engaging part which integrally engages a camera body (not shown), a back cover part 16a, and a contact block 16b which is provided for electrical communication with the camera body.

An electric circuit board 17 is provided with a microcomputer 17a for control over the whole lens barrel and is electrically coupled to the focus driving unit 12, the zoom driving unit 13, the zoom signal detecting circuit board 14, the focus signal detecting circuit board 15, the contact block 16b and the electromagnetic diaphragm unit 7 via a flexible circuit board (not shown) for supply of power, exchange of signals and control.

FIG. 2 shows in development view the essential parts of the lens barrel when the zoom lens is in a telephoto position. FIG. 3 shows the same in a wide-angle position. The zooming (magnification varying) and focusing actions of the embodiment are next described with reference to FIGS. 1 to 3 as follows:

As the zoom driving unit 13 is driven, the zoom cam ring 2 is rotated through the output gear 13a and the gear part 2f of the zoom cam ring 2. With the zoom cam ring 2 rotated, the roller 4a of the first lens group tube 4 and the roller 6a of the third lens group tube 6 which respectively engage the cam slot 2b formed in the zoom cam ring 2 for the first lens group L1 and the cam slot 2c formed in the zoom cam ring 2 for the third lens group L3 and which engage the longitudinal slots 1b formed in the guide part 1a of the fixed member 1, receive a force exerted in the direction of the optical axis. The first lens group tube 4 and the third lens group tube 6 are thus driven to move in the direction of the optical axis.

Further, as the zoom cam ring 2 is rotated, a turning force is exerted on the pins 3b which are provided on the focus cam ring 3 and which engage the rectilinear slots 2d formed in the zoom cam ring 2. At the same time, the pins 3b rotate to the same extent and in the same direction as the cam ring 2 and thus move in the direction of the optical axis to an extent determined by the shape of the zoom correction cams 1c provided in the guide part 1a of the fixed member 1. This motion of the pins 3b then causes the focus cams 3a formed in the focus cam ring 3 to move at the same time.

At this time, since the focus pin 5a of the second lens group tube 5 engages the longitudinal groove 11b of the focus rotation member 11 and its motion in the turning direction is thus restricted, the phase of engagement with the focus cams 3a of the focus cam ring 3 varies to vary the focusing positions of the focus cams 3a. The pin 5a is then driven in the direction of the optical axis under this condition. In the case of this embodiment, the amount of drawing-out of the second lens group tube 5 is caused to vary in the above-stated manner in accordance with a zooming action. The image magnification of the zoom lens is thus varied, for example, from a telephoto end state as shown in FIG. 2 to a wide-angle end state as shown in FIG. 3.

On the other hand, as the focus driving unit 12 is driven, the focus rotation member 11 is rotated via the output gear 12a and the gear part 11c. The rotating action is performed in a state of having the longitudinal groove 11b which is formed in the focus rotation member 11 engaging the focus pin 5a which is provided on the outer circumferential part of the second lens group tube 5. Then, since the focus pin 5a is engaging the focus cam 3a, the focus pin 5a is driven to move along the focus cam 3a in the direction of the optical axis. As a result, a focus adjusting action is carried out with the second lens group L2 which is held by the second lens group tube 5 caused to move in the direction of the optical axis while making a rotating motion.

A zoom driving control which represents an advantageous feature of this invention is next described as follows with reference to FIG. 4 which is a block diagram. A zoom signal detecting means 101 is composed of the zoom brush 9b and the zoom signal detecting circuit board 14 which are shown in FIG. 1. A zoom signal is outputted from the zoom signal detecting means 101. A zoom amount signal and a zoom driving direction signal are obtained from the zoom signal respectively by a zoom amount detecting means 102 and a zoom driving direction detecting means 103.

To a backlash determining means 105, the zoom driving direction signal is supplied from the zoom driving direction detecting means 103 and a signal indicative of the last focus driving direction is supplied from a focus driving direction storing means 104. On the basis of the two supplied signals, the backlash determining means 105 determines whether a backlash eliminating action is necessary or not. In the case of this embodiment, for example, it is determined that the backlash eliminating action is necessary if the direction in which the zoom cam ring 2 has to be rotated according to the zoom driving direction designated is found to coincide with the direction in which the focus rotation member 11 has been rotated by the last focus driving. If not, it is determined that the backlash eliminating action is not necessary.

The result of determination made by the backlash determining means 105 is supplied to a backlash eliminating driving means 106. If it has been determined that the backlash eliminating action is necessary, the backlash eliminating driving means 106 causes a focus driving means 108 to drive and control the focus driving unit 12 by a presumed amount of backlash stored beforehand in such a way as to eliminate backlash. After the backlash eliminating action has been performed, a backlash elimination completion signal is supplied from the backlash eliminating driving means 106 to a zoom driving control means 107. On the other hand, if it has been determined that the backlash eliminating action is not necessary, the backlash elimination completion signal is supplied to the zoom driving control means 107 without performing the backlash eliminating driving process.

To the zoom driving control means 107 are supplied the zoom amount signal from the zoom amount detecting means 102, the zoom driving direction signal from the zoom driving direction detecting means 103 and the backlash elimination completion signal from the backlash eliminating driving means 106. Upon receipt of these signals, after confirming the completion of the backlash eliminating process, the zoom driving control means 107 controls the zoom driving unit 13 so that zooming is performed by a desired zoom amount and in a desired zoom driving direction.

Focus driving control is performed as follows. In the event of automatic focusing, an in-focus detection signal from a camera body (not shown) is supplied to the lens barrel side via the contact block 16b. The focus driving unit 12 is then driven and controlled according to the in-focus detection signal. In the event of manual focusing, a focus signal is detected through the focus brush 10a and the focus signal detecting circuit board 15, and the focus driving unit 12 is driven and controlled accordingly in such a way that focusing is performed by a desired focus amount and in a desired focus driving direction.

The focus driving direction is always detected by means of an encoder (not shown), irrespective of automatic focusing or manual focusing, and is supplied to and stored at the focus driving direction storing means 104. The contents of the focus driving direction storing means 104 are cleared every time a signal indicative of a new focus driving direction is supplied, so that stored information about the focus driving direction is always updated.

Figure 5:
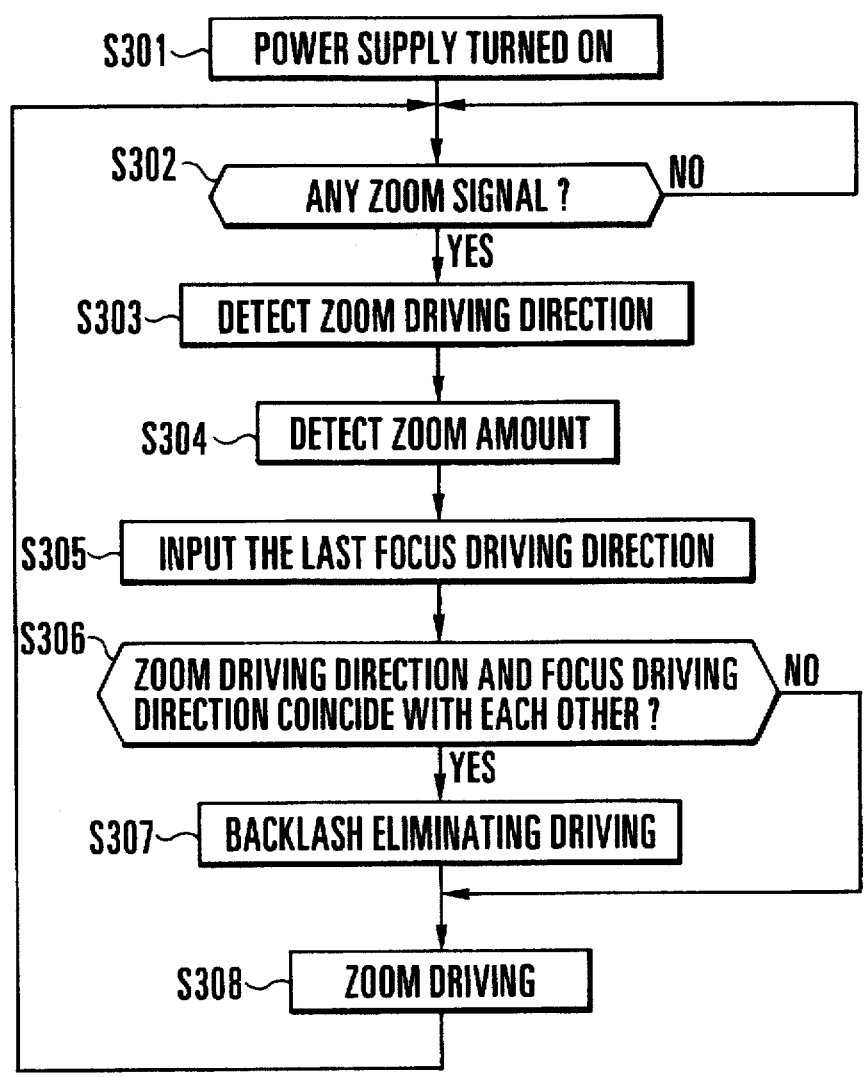
FIG. 5 is a flow chart showing an operation of the first embodiment of this invention.

FIG. 5 is a flow chart showing by way of example the zooming and focusing actions of this embodiment. The operation of the camera of this embodiment is described with reference to this flow chart as follows.

At a step S301, when a power supply is turned on, the contents of a microcomputer which is disposed within the lens barrel are cleared. After that, the communication between the lens barrel and the camera body and the detecting actions of various detecting means such as switches are started.

Figure 4:
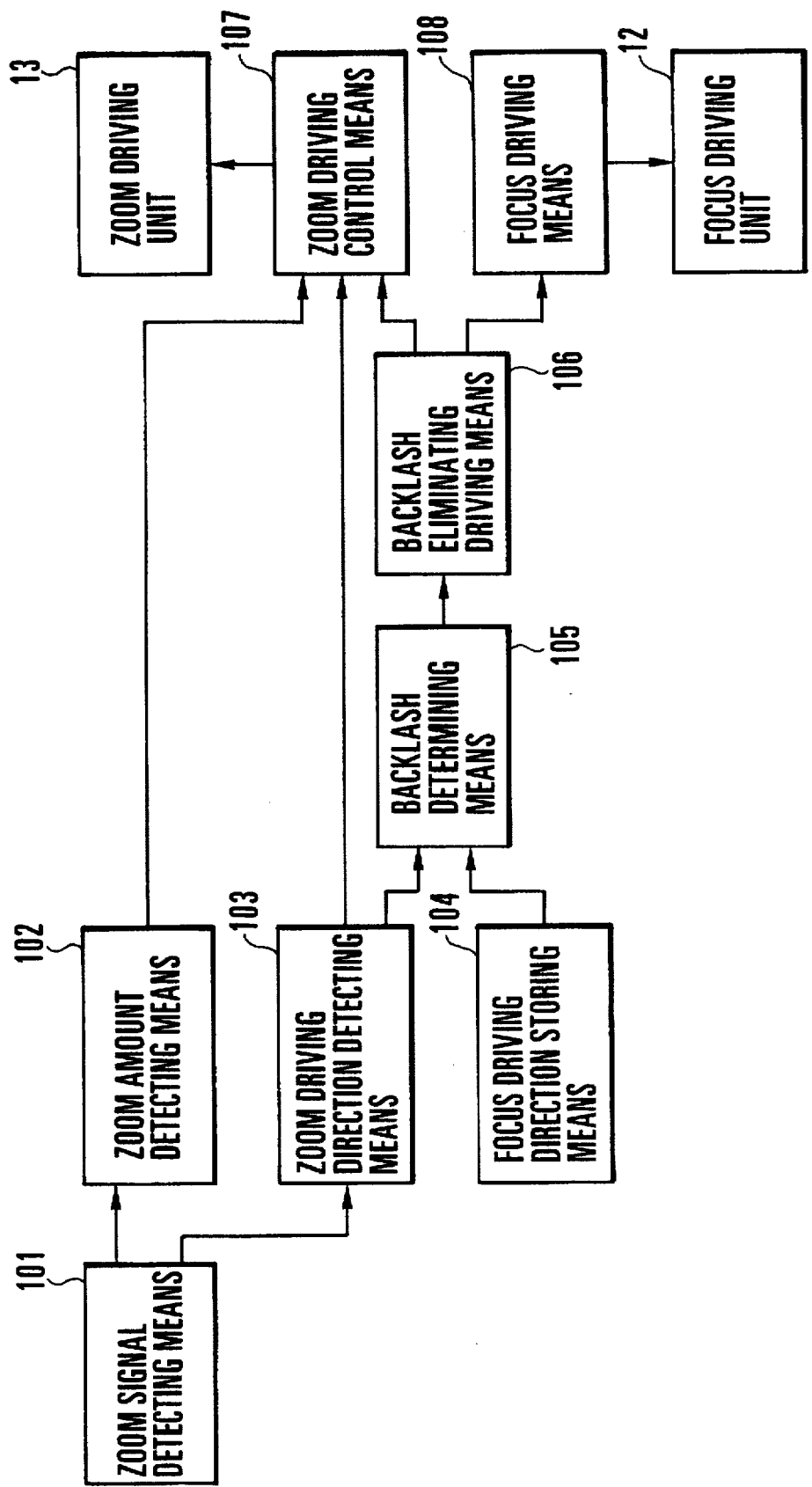
FIG. 4 is a block diagram showing the essential parts of the first embodiment of this invention.

At a step S302, a check is made to find if a zoom signal is inputted from the zoom signal detecting means 101 which is shown in the block diagram of FIG. 4. If so, the flow of operation proceeds to a step S303. If not, the flow waits at the step S302 until the zoom signal is inputted.

At a step S303, the zoom driving direction is detected by the zoom driving direction detecting means 103 which is shown in the block diagram of FIG. 4. The flow then proceeds to a step S304.

At the step S304, the zoom amount detecting means 102 which is shown in the block diagram of FIG. 4 begins to count a desired zoom amount. The flow then proceeds to a step S305.

At the step S305, information about the last focus driving direction is inputted from the focus driving direction storing means 104 which is shown in the block diagram of FIG. 4. The flow proceeds to a step S306.

At the step S306, the backlash determining means 105 which is shown in the block diagram of FIG. 4 compares the zoom driving direction found by the step S303 with the last focus driving direction found by the step S305. If the two directions are found to coincide with each other, the flow proceeds to a step S307. If not, the flow comes to a step S308.

At the step S307, the backlash eliminating driving means 106 which is shown in the block diagram of FIG. 4 causes the focus driving means 108 to drive the focus driving unit 12 by a presumed amount of backlash stored beforehand. The flow then proceeds to the step S308.

At the step S308, the zoom driving control means 107 which is shown in the block diagram of FIG. 4 controls the zoom driving unit 13 so that zooming is performed in the detected zoom driving direction until the desired zoom amount as counted has been reached. Upon completion of the control over the zoom driving unit 13, the flow comes back to the step S302.

Figure 6:
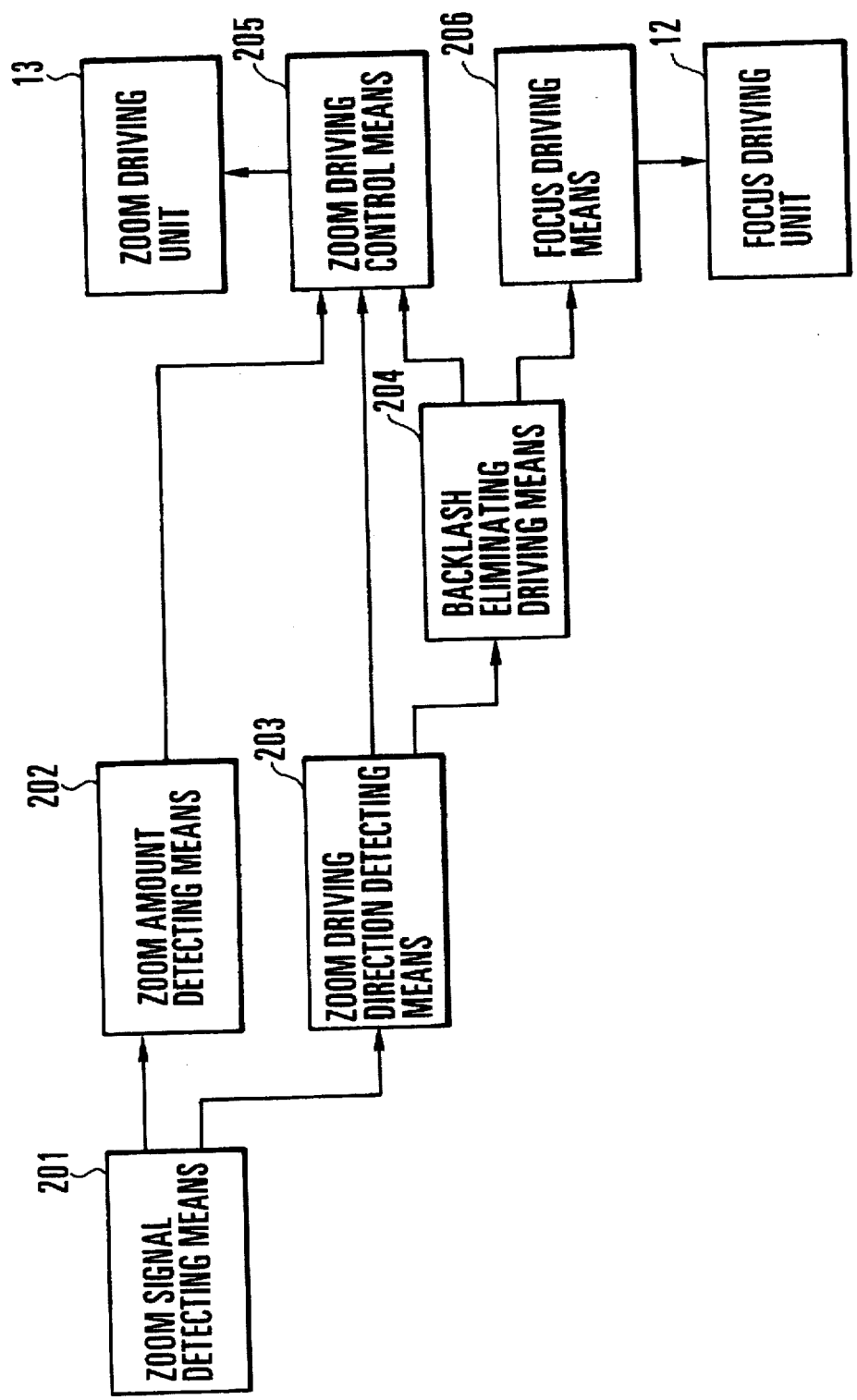
FIG. 6 is a block diagram showing the essential parts of a second embodiment of this invention.

FIG. 6 is a block diagram showing essential parts of a second embodiment of this invention. The mechanical arrangement of the second embodiment is identical with that of the first embodiment. The second embodiment differs from the first embodiment only in respect of zoom driving control. Referring to FIG. 6, first, a zoom signal is outputted from a zoom signal detecting means 201 which is composed of the zoom brush 9b and the zoom signal detecting circuit board 14 in the same manner as in the first embodiment. Then, on the basis of the zoom signal, a zoom amount signal is obtained by a zoom amount detecting means 202 and a zoom driving direction signal is obtained by a zoom driving direction detecting means 203.

The zoom driving direction signal is supplied to a backlash eliminating driving means 204. In the case of the second embodiment, a backlash eliminating process is carried out by causing a focus driving means 206 to drive and control the focus driving unit 12 for a predetermined period of time at a voltage which is lower than a normal voltage and which does not cause the focus pin 5a to move, in the direction of rotating the focus rotation member 11 in a direction opposite to the rotating direction designated by the zoom driving direction signal coming from the zoom cam ring 2, which is arranged in the same manner as in the case of the first embodiment. After completion of the backlash eliminating process, a backlash elimination completion signal is outputted.

The zoom signal from the zoom amount detecting means 202, the zoom driving direction signal from the zoom driving direction detecting means 203 and the backlash elimination completion signal from the backlash eliminating driving means 204 are supplied to a zoom driving control means 205. Upon receipt of these signals, after confirming the completion of the backlash eliminating process, the zoom driving control means 205 controls the zoom driving unit 13 which is arranged in the same manner as in the case of the first embodiment, so that zooming is performed by a desired zoom amount and in a desired zoom driving direction.

According to the arrangement of each of the embodiments described above, an optical apparatus such as a rear-focus type zoom lens arranged to make focus adjustment by causing a focusing lens group to move along an optical axis following a magnification varying action is arranged to be capable of accurately carrying out the magnification varying action by adequately correcting any changes in focus brought about by the backlash of a focus driving system in driving the focusing lens group.

What is claimed is:

1. A lens barrel comprising:
    a first lens arranged to move for varying a magnification of an image;
    a second lens arranged to move for focusing and for compensating for a change in focusing position due to movement of said first lens;
    focusing means for driving said second lens;
    zooming means for driving said first lens and said second lens, said zooming means moving said second lens by using a part of said focusing means, said part of the focusing means having a backlash; and
    correcting means for correcting the backlash of said part of the focusing means when a zooming operation is performed by said zooming means.

2. A lens barrel according to claim 1, wherein, before the zooming operation is performed by said zooming means, the backlash of said part of the focusing means is corrected.

3. A lens barrel according to claim 1, wherein said correcting means corrects the backlash by using said focusing means.

4. A lens barrel according to claim 3, wherein, before the zooming operation is performed by said zooming means, the backlash of said part of the focusing means is corrected.

5. A lens barrel according to claim 4, wherein said first lens includes a plurality of lens units.

6. A lens barrel according to claim 4, wherein said zooming means includes a first cam which is provided for driving said first lens and which extends in a direction obliquely intersecting an optical axis direction and a second cam which is provided for driving said second lens and which extends in a direction obliquely intersecting the optical axis direction, said focusing means includes a rectilinear cam which extends in the optical axis direction, said second lens is held by a holding member having a cam follower, and said cam follower is inserted both into said second cam and said rectilinear cam, and
    wherein said focusing means is arranged to move said cam follower through said second cam in the optical axis direction by displacing said rectilinear cam in a direction intersecting the optical axis direction, and said zooming means is arranged to move said cam follower through said rectilinear cam in the optical axis direction by displacing said second cam in the optical axis direction and a direction intersecting the optical axis direction.

7. A lens barrel according to claim 6, wherein said zooming means includes means for displacing said second cam in the optical axis direction and a direction intersecting the optical axis direction in such a way as to cause an amount of driving of said second lens by said focusing means to vary according to a state of zooming.

8. A lens barrel according to claim 7, wherein said correcting means comprises information storing means for storing information about a driving direction in a focusing operation, information forming means for forming information indicative of a driving direction for the zooming operation, and determining means for determining, on the basis of information from said information storing means and information from said information forming means, whether or not the backlash is to be corrected,
    wherein said determining means determines that the backlash is to be corrected if the driving direction in the focusing operation and the driving direction for the zooming operation coincide with each other, and determines that the backlash is not to be corrected if the driving direction in the focusing operation and the driving direction for the zooming operation are opposite to each other, and wherein, when it is determined that the backlash is to be corrected, said focusing means is driven so as to correct the backlash.

9. A lens barrel according to claim 1 or 7, wherein said focusing means is arranged to perform an electrical driving operation and to correct the backlash with a driving voltage which is lower than a driving voltage used for the focusing operation.

10. A lens barrel according to claim 1, further comprising information storing means for storing information about a driving direction in a focusing operation, information forming means for forming information indicative of a driving direction for the zooming operation, and determining means for determining, on the basis of information from said information storing means and information from said information forming means, whether or not the backlash is to be corrected.

11. An optical apparatus comprising:

a first lens arranged to move for varying a magnification of an image;

a second lens arranged to move for focusing and for compensating for a change in focusing position due to movement of said first lens;

focusing means for driving said second lens;

zooming means for driving said first lens and said second lens, said zooming means moving said second lens by using a part of said focusing means, a said part of the focusing means having a backlash; and correcting means for correcting the backlash of said part of the focusing means when a zooming operation is performed by said zooming means.

12. An optical apparatus according to claim 11, wherein, before the zooming operation is performed by said zooming means, the backlash of said part of the focusing means is corrected.

13. An optical apparatus according to claim 11, wherein said correcting means corrects the backlash by using said focusing means.

14. An optical apparatus according to claim 13, wherein, before the zooming operation is performed by said zooming means, the backlash of said part of the focusing means is corrected.

15. An optical apparatus according to claim 14, wherein said first lens includes a plurality of lens units.

16. An optical apparatus according to claim 14, wherein said zooming means includes a first cam which is provided for driving said first lens and which extends in a direction obliquely intersecting an optical axis direction and a second cam which is provided for driving said second lens and which extends in a direction obliquely intersecting the optical axis direction, said focusing means includes a rectilinear cam which extends in the optical axis direction, said second lens is held by a holding member having a cam follower, and said cam follower is inserted both into said second cam and said rectilinear cam, and wherein said focusing means is arranged to move said cam follower through said second cam in the optical axis direction by displacing said rectilinear cam in a direction intersecting the optical axis direction, and said zooming means is arranged to move said cam follower through said rectilinear cam in the optical axis direction by displacing said second cam in the optical axis direction and a direction intersecting the optical axis direction.

17. An optical apparatus according to claim 16, wherein said zooming means includes means for displacing said second cam in the optical axis direction and a direction intersecting the optical axis direction in such a way as to cause an amount of driving of said second lens by said focusing means to vary according to a state of zooming.

18. An optical apparatus according to claim 17, further comprising information storing means for storing information about a driving direction in a focusing operation, information forming means for forming information indicative of a driving direction for the zooming operation, and determining means for determining, on the basis of information from said information forming means, whether or not the backlash is to be corrected, wherein said determining means determines that the backlash is to be corrected if the driving direction in the focusing operation and the driving direction for the zooming operation coincide with each other, and determines that the backlash is not to be corrected if the driving direction in the focusing operation and the driving direction for the zooming operation are opposite to each other, and wherein, when it is determined that the backlash is to be corrected, said focusing means is driven so as to correct the backlash.

19. An optical apparatus according to claim 11 or 17, wherein said focusing means is arranged to perform an electrical driving operation and to correct the backlash with a driving voltage which is lower than a driving voltage used for the focusing operation.

20. An optical apparatus according to claim 11, wherein said correcting means comprises information storing means for storing information about a driving direction in a focusing operation, information forming means for forming information indicative of a driving direction for the zooming operation, and determining means for determining, on the basis of information from said information storing means and information from said forming means, whether or not the backlash is to be corrected.

* * * * *

UNITED STATES PATENT AND TRADEMARK OFFICE
CERTIFICATE OF CORRECTION

PATENT NO.    : 5,724,194
DATED         : March 3, 1998
INVENTOR(S)   : Masanori Ishikawa It is certified that error appears in the above-identified patent and that said Letters Patent is hereby corrected as shown below:

Title page,
Item [54], Title, "OPTICAL APPARATUS INCLUDING ZOOMING MEANS FOCUS INCLUDING A PART HAVING A BACKLASH, AND CORRECTION MEANS FOR CORRECTING THE BACKLASH OF THE FOCUS APPARATUS" should read -- OPTICAL APPARATUS INCLUDING ZOOMING MEANS, FOCUS MEANS INCLUDING A PART HAVING A BACKLASH, AND CORRECTION MEANS FOR CORRECTING THE BACKLASH OF THE FOCUS APPARATUS --.

Item [56], References Cited, FOREIGN PATENT DOCUMENTS, "3144411" should read -- 3-144411 --.

Signed and Sealed this

Ninth Day of November, 2004

JON W. DUDAS
*Director of the United States Patent and Trademark Office*